(12) United States Patent
Gaultier

(10) Patent No.: US 6,321,982 B1
(45) Date of Patent: Nov. 27, 2001

(54) METHOD FOR THE IDENTIFICATION OF ELECTRONIC CARDS

(75) Inventor: Jean-Marie Gaultier, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/268,970

(22) Filed: Mar. 16, 1999

(30) Foreign Application Priority Data

Mar. 16, 1998 (FR) .................................. 98 03183

(51) Int. Cl.⁷ .............................. G06F 17/00; G06K 5/00
(52) U.S. Cl. .......................................... 235/380; 235/375
(58) Field of Search ..................... 235/375, 380; 340/825.02, 825.49, 10.1, 10.32, 10.33; 342/42, 51

(56) References Cited

U.S. PATENT DOCUMENTS

| | | | | |
|---|---|---|---|---|
| 4,071,908 | * | 1/1978 | Brophy et al. .................. | 340/825.02 |
| 5,266,925 | * | 11/1993 | Vercellotti et al. ............. | 340/825.47 |
| 5,489,908 | * | 2/1996 | Orthmann et al. ...................... | 342/44 |
| 5,602,538 | * | 2/1997 | Orthmann et al. .............. | 340/825.49 |
| 5,856,788 | * | 1/1999 | Walter et al. ......................... | 235/380 |
| 5,929,801 | * | 7/1999 | Aslanidis et al. ...................... | 342/44 |
| 6,072,801 | * | 6/2000 | Wood, Jr. et al. .................... | 370/437 |

FOREIGN PATENT DOCUMENTS

| | | | |
|---|---|---|---|
| 0 322 701 A2 | 12/1988 | (EP) | ............................... G01S/13/78 |
| 0 702 324 A2 | 8/1995 | (EP) | ............................... G06K/17/00 |
| 0 696 011 A2 | 7/1995 | (EP) | ............................... G06K/7/08 |
| 0 285 419 A2 | 3/1988 | (EP) | ............................... G07C/9/00 |
| 8 802 718 | 6/1990 | (NL) | ............................... G08B/13/24 |

* cited by examiner

Primary Examiner—Karl D. Frech
Assistant Examiner—Larry D Taylor
(74) Attorney, Agent, or Firm—Theodore E. Galanthay; Allen, Dyer, Doppelt, Milbrath & Gilchrist, P.A.

(57) ABSTRACT

A method for the identification of electronic cards within an investigation zone includes an identification number uniquely assigned to each electronic card. The method reconstructs the identification numbers according to a tree-like iterative algorithm. The algorithm includes the steps of sending an interrogation message intended for certain electronic cards present, and steps for sending a response message by the electronic cards. The response message includes a variable number whose value depends on the identification number of the electronic card. The interpretation of the existence and of the position at which a collision occurs between the bits of the variable numbers received enables the gradual reconstruction, possibly by blocks of bits, of the as yet unidentified bits of an identification number of an electronic card present.

28 Claims, 4 Drawing Sheets

FIG. 4

| | MESSAGE | VN$_{11}$ | VN$_{12}$ | VN$_{13}$ | VN$_{14}$ | VN$_{15}$ | RN | i | k' |
|---|---|---|---|---|---|---|---|---|---|
| 1 | GC | 01100001 | 01110010 | 00100110 | 00100111 | 01110000 | 01xxxxxx | 2 | 3 |
| 2 | PC(2) | 10000111 | 11001011 | | | 11000011 | 0111xxxx | 2 | 5 |
| 3 | PC(2) | | 00101111 | | | | 0111001x | 3 | 8 |
| 4 | PC(3) | | 01111111 | | | | 01110010 | 0 | 1 |
| 5 | GC | 01100001 | | 00100110 | 00100111 | 01110000 | 01xxxxxx | 2 | 3 |
| 6 | PC(2) | 10000111 | | | | 11000011 | 0111xxxx | 2 | 5 |
| 7 | PC(2) | | | | | 00001111 | 01110000 | 0 | 1 |
| 8 | GC | 01100001 | | 00100110 | 00100111 | | 01xxxxxx | 2 | 3 |
| 9 | PC(2) | 10000100 | | | 00100111 | | 01100001 | 0 | 1 |
| 10 | GC | | | 00100110 | | | 00100111 | 8 | 1 |
| 11 | GC | | | 00100110 | | | 00100110 | 0 | 1 |
| 12 | GC | | | | | | xxxxxxxx | 0 | 1 |

METHOD FOR THE IDENTIFICATION OF ELECTRONIC CARDS

FIELD OF THE INVENTION

The present invention relates to the field of dentification systems, and, more particularly, to the dentification of electronic cards.

BACKGROUND OF THE INVENTION

A fixed interrogation unit 10 as shown in FIG. 1, is capable of communicating or exchanging messages with a plurality of electronic cards 11–16 that are mobile with respect to the interrogation unit. The communication is wireless, i.e., the messages are transmitted by RF or microwave electromagnetic carrier waves. The transmission channel is thus formed by the ambient atmosphere.

An electronic card 11 may be an electronic module, a badge or a chip card, and may be carried by an individual, a vehicle, an instrument, cattle, etc. The interrogation unit 10 may be contained in a base station, an access control terminal, an on-the-fly toll-gate, etc. As an alternative, the interrogation unit 10 is mobile and the electronic cards 11–16 are fixed. As another alternative, the interrogation unit 10 and the electronic cards 11–16 are both mobile.

In all three cases, the electronic cards 11–15 may be located within a zone 20 centered around the interrogation unit 10. The zone 20 is the range of the messages exchanged, whereas other electronic cards 16 may be outside this zone. In FIG. 1, the boundary of this zone 20 is indicated by a dashed line 25. The boundary of a zone 20 may vary in time, for example, because of the presence of foreign objects forming a shield against the propagation of the electromagnetic waves.

The volume of air contained in the zone 20 forms the channel for the transmission of the messages exchanged between the interrogation unit 10 and the electronic cards 11–15. This channel is unique and has to be time-shared according to a communications protocol between the interrogation unit 10 and the electronic cards 11–15. This protocol is of the master/slave type. Each exchange of a message between the interrogation unit 10 (master) and a specified electronic card 11 (slave) is initiated by the interrogation unit.

By default, the electronic cards 11–15 are in a state such that they cannot receive control messages sent by the interrogation unit 10 and, therefore, are even less capable of answering these messages. In other words, the electronic cards 11–15 are referred to as being in an asleep state. This is why, before sending a control message intended for a specified electronic card 11, the interrogation unit 10 must first of all awaken each electronic card 11 to place it in a state enabling it to receive the control message and, as the case may be, to respond to it by sending a response message. The interrogation message contains a particular message W, called an "awakening" message, intended for a particular electronic card 11. After sending the control message and, if necessary, after reception of the response message, the interrogation unit 10 sends a particular message S called a "putting-to-sleep message" for the electronic card 11. The electronic card 11 then goes back into the state in which it cannot receive any control messages.

The awakening message W and the putting-to-sleep message S each have a unique parameter. This parameter is a number for the identification of the electronic card 11 for which these messages are intended. This is why they will respectively be written as W(X) and S(X), where X is the value of an identification number enabling the identification of the electronic card 11 for which the control message is intended. An identification number of this kind is uniquely assigned to each electronic card 11. In other words, a single identification number is associated with each electronic card 11.

However, because of the mobility of the electronic cards 11–15 and/or its own mobility, the interrogation unit 10 has no a priori knowledge of whether the electronic cards 11–15 are in the zone 20 corresponding to the range of the messages. As the case may be, the interrogation unit 10 does not know the number of electronic cards 11–15 present and does not know which of the electronic cards are present.

This is why implementation of an identification system requires a method by which the interrogation unit 10 can identify the electronic cards 11–15 present within the zone 20, and corresponds to the range of the messages to be exchanged.

Hereinafter, this zone 20 is called the "investigation zone" inasmuch as it is the zone within which such a method detects and identifies the electronic cards 11–15 present. To identify an electronic card that is present is to identify its identification number. It is the knowledge of the identification numbers of the electronic cards 11–15 present that provides for the management of the exchanges of the control messages.

In the prior art, identification methods of this kind have already been proposed. These known methods implement an arborescent iterative algorithm enabling the bit-by-bit reconstruction of the identification number of each electronic card present in the investigation zone 20. To put it briefly, it is possible to represent all the values of identification numbers in a tree-like structure.

According to the terminology proper to this type of structure, as used especially in the field of computers, the root of the tree provides two branches. Each branch ends in a node corresponding to the logic value 1 and 0, respectively, of a first bit of these identification numbers, for example, the most significant bit. These two nodes each give rise to two new branches that each end in a node corresponding to the logic value 1 and 0, respectively, of another bit of the identification number, for example, the immediately less significant bit. Thus, the method continues in the same way up to the last generation of the tree starting from the root. The tree has as many generations as there are bits to encode with respect to the identification numbers.

In other words, each node other than those of the first generation has a parent corresponding to the logic value of the more significant bit. The first generation corresponds to the logic value of the most significant bit. Each node other than the node of the last generation has two children corresponding to the logic value of the less significant bit. The last generation corresponds to the value of the least significant bit of the identification number. Any journey made in the tree from the root to the node of the last generation enables a logic value 1 or 0 to be assigned to each bit of the identification number, beginning with the most significant bits in the example.

The principle of the known methods lies precisely in travelling through the tree of FIG. 2 to deduce therefrom the identification numbers of the electronic cards 11–15 present in the investigation zone 20. More specifically, these methods include the steps of sending, by the interrogation unit 10, of interrogation messages intended for the electronic cards 11–15 present in the investigation zone 20, or at least for a group of such cards which are authorized to respond, and sending response messages by the cards.

The interpretation of the response messages received by the interrogation unit 10 at each iteration of the algorithm makes it possible to go forward in the tree of the identification numbers by identifying the value of an additional bit of the identification number of at least one of the electronic cards 11–15. In the known method of identification, each response message sent by an electronic card 11 authorized to respond includes the full identification number of the electronic card.

When several electronic cards 11–15 are simultaneously in the investigation zone 20 and are authorized to respond, several electronic cards may simultaneously send a response message. There is then a collision for the electronic signals that transit simultaneously on the transmission channel. These collisions get added up and, ultimately, corrupt one another. In particular, there may be a collision between the bits of the identification numbers sent by different electronic cards 11–15 responding simultaneously to an interrogation message sent by the interrogation unit 10.

At present, there are known methods that make it possible to overcome this problem of collision, or even use this phenomenon according to a particular algorithm of identification. The tree-like iterative methods known in the prior art lend themselves well to implementation by a software method which, as is known, is particularly simple to perform with currently used, reliable and economical electronic circuits 11–15, such as microcontrollers. However, these known methods have, among other drawbacks, the specific feature of being too slow inasmuch as the exploration of the entire tree of the identification numbers is lengthy, and all the more lengthier as the identification number is encoded on a large number of bits.

In certain applications, it is necessary to provide for the coexistence of a large number of different electronic cards 11–15 to provide for a larger number of bits to encode their respective identification numbers. At the same time it must be known that, in most cases, only a very small number of them will be simultaneously present in the investigation zone 20. This is the case, for example, in an on-the-fly toll-gate system where the electronic cards 11–15 are transponder-based modules fitted into each automobile whose owner is a subscriber to the service concerned, or where the interrogation unit 10 is contained in a fixed toll-gate terminal.

SUMMARY OF THE INVENTION

An object of the present invention is to provide an improved method for the identification of electronic cards that is faster than prior art methods.

A method for the identification of electronic cards, to each of which there is uniquely assigned an identification number encoded on M bits, includes the reconstruction of the identification numbers of the electronic cards present in an identification zone according to a tree-like iterative algorithm. According to the invention, this algorithm includes at each iteration the following steps:

A) Sending, by an interrogation unit, an interrogation message which may be either a general interrogation message intended for all the as yet unidentified electronic cards present in the investigation zone. A general interrogation message of this kind is sent, in particular, at the first iteration of the method.

Or, a particular interrogation message intended for only certain of the electronic cards authorized to respond to such a message is sent by the interrogation unit.

B) Sending a response message including a variable number if the interrogation message is a general interrogation message, simultaneously by each of the as yet unidentified electronic cards present. In which case the value of the identification number of the electronic card is assigned before sending the message as the current value of the variable number.

Or, if the interrogation message is a particular interrogation message, simultaneously by only those of the electronic cards present authorized to respond to such a message that have a variable number whose kth bit has an arbitrary logic value 1 or 0. In which case, the current value of the variable number is modified before being sent by a shift of its bits by a number of positions equal to k, where k is an integer parameter of the particular interrogation message. The other cards of this kind are placed in a state where they are no longer authorized to respond to the particular interrogation messages, and from which they come out only at the reception of a new general interrogation message.

C) Simultaneously receiving the response messages by the interrogation unit and analyzing the numbers received.

C.1) In the event of the reception of at least two response messages, namely a collision defined as the simultaneous reception of two bits of different values which then come into play necessarily at a position i of the variable numbers received simultaneously, to identify the value of a group of i bits of the number of an as yet unidentified electronic card present and, in looping to step A), to send a particular interrogation message whose parameter k is assigned a value of i.

C.2) Or, in the event of reception of a single response message, to identify a group of the j as yet unidentified last bits of the identification number of an electronic card present so that the electronic card is identified and, in looping to step A), to send a general interrogation message.

According to one advantage of the invention, the identification number of an electronic card present is restored not bit by bit, but by block of bits by block of bits. The size of a block is variable and is determined by the position i at which a collision, if any, occurs between the bits of the variable numbers sent by the electronic cards. Thus, the identification of the electronic cards present may require fewer iterations than there are bits to be identified.

According to another advantage, when a single card, or at least a single as yet unidentified electronic card is in the investigation zone, its identification requires only one iteration inasmuch as its full identification number is sent in response to a general interrogation message.

BRIEF DESCRIPTION OF THE DRAWINGS

Other features and advantages of the invention shall appear more clearly from the following detailed description. This description is given purely by way of an illustration made with reference to the appended drawings, of which:

FIG. 4 is a table showing the progress during implementation of the method according to the present invention for the identification of five cards present, including contents of the registers of the electronic cards and of the interrogation unit.

DETAILED DESCRIPTION OF THE PREFERRED EMBODIMENTS

The transmission of the messages by the interrogation unit 10 and by the electronic cards 11–15 is done according to a specified communications protocol which specifies the format and syntax of the messages. The transmission is done synchronously. It is sequenced at a specified rate. The interrogation unit 10 and the electronic cards 11–15 include known means to synchronize to the rate of the same clock or two synchronous or asynchronous clocks.

Figure 2:
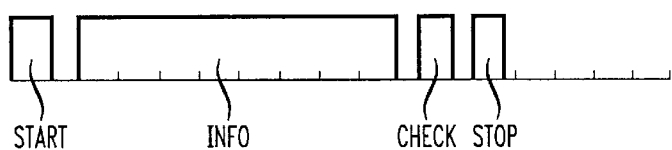
FIG. 2. shows an exemplary format of a transmitted message, according to the present invention.

FIG. 2 shows an example of a message format for implementation of the invention. The messages sent includes one or more useful information words and several service bits. The message includes a starting bit START whose function is to synchronize the clock of the addressee unit with the received message. Then, the message includes a useful information word INFO that is encoded, for example, on eight bits (one byte). This word may be an instruction word whose value indicates a command to be carried out by the addressee unit. It may also be an address word whose value indicates the address, or a part of the address of a memory location of the addressee unit. At this memory location of the addressee unit, for example, a data element may be read or written. Finally, it may also be a data word whose value indicates the value of a data element to be processed by the addressee unit.

The message also includes a check bit CHECK which, in particular, may be a parity check bit. The value of the parity check bit CHECK is fixed at the logic value 1 or 0 to complement the sum of the values of the bits of the useful information word INFO at an even value or an odd value depending on the type of parity chosen. The role of the parity check bit CHECK is to enable the addressee unit to detect transmission errors, if any. In such a case, the addressee unit may request that the message should be sent again. Transmission errors may be caused by disturbances in the channel.

Furthermore, the protocol generally provides for a number of elementary temporal units following the bit STOP, during which the sending unit no longer sends any bit on the channel to leave it free for the addressee unit to send an acknowledgment bit with a specified logic value to acknowledge the communication. The value of this acknowledgment bit states whether the message has been accurately received, especially as a function of the check performed by the check bit CHECK, and if it is required that the message should be sent again. FIG. 2 shows four such elementary temporal units following the above-mentioned bit STOP.

As those skilled in the art will understand, an elementary temporal unit corresponds to the normal duration of transmission of a bit. This duration depends on a digital bit rate of the transmission. The syntax of the messages sent, namely the order of sending of the different useful information words transmitted, e.g., a control word, an address word or a data word, is determined by the communications protocol proper to the system.

Figure 1:
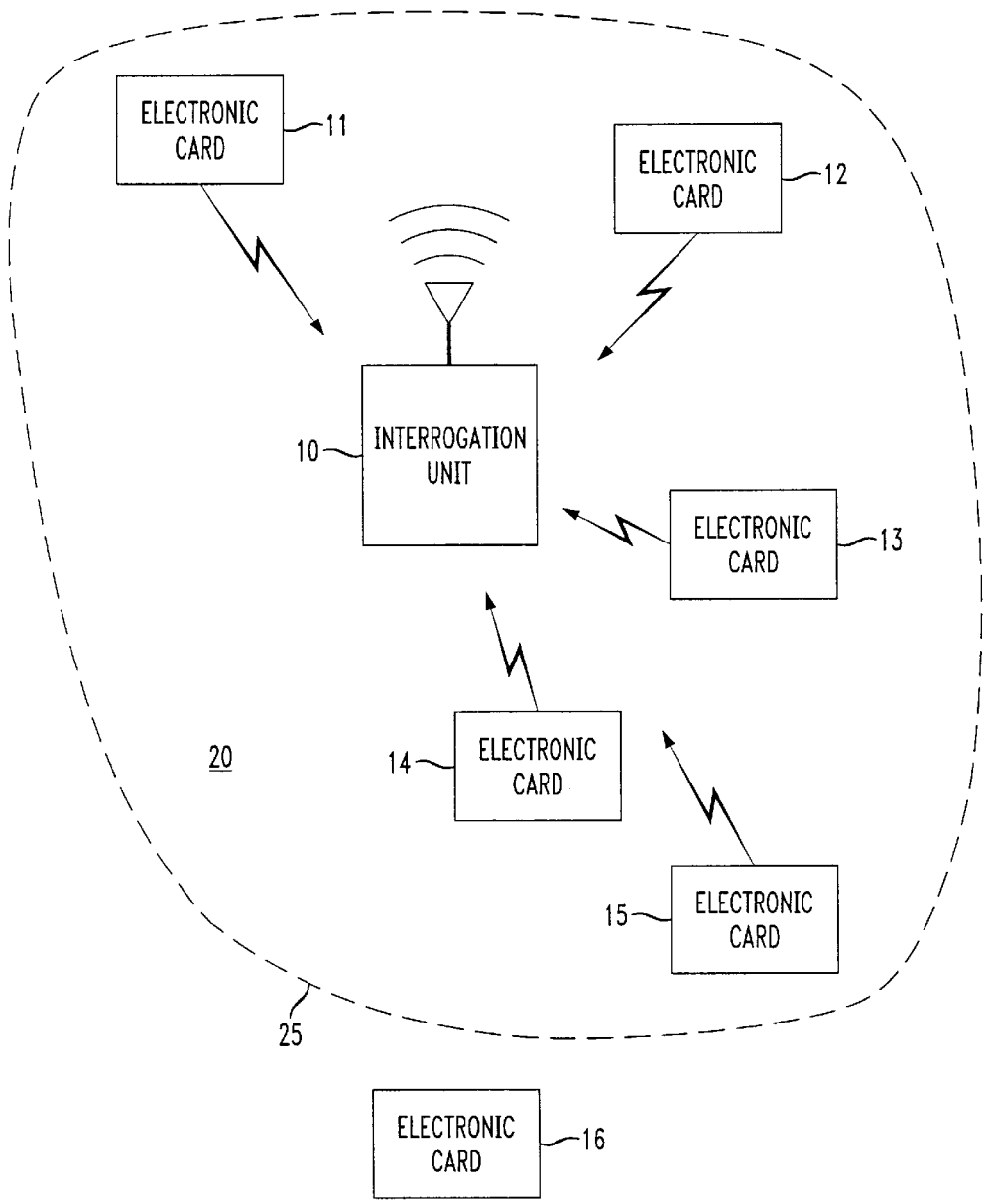
FIG. 1 shows an exemplary system including an interrogate unit and a plurality of electronic cards, according to the prior art.

In the following exemplary implementation of the method according to the invention, each of the electronic cards 11–15 are uniquely assigned an identification number encoded on eight bits. In each electronic card 11, the identification number is saved in a memory. In certain applications, the identification number is assigned in the plant during the manufacture of the electronic card 11. The memory is then a non-volatile memory of an EPROM, EEPROM, EPROM-Flash, or other type. Hereinafter, it should be assumed that such is the case. However, in other applications, the identification number may be defined randomly and assigned to each electronic card 11 dynamically during its first entry into the range zone 20 surrounding the interrogation unit 10, as shown in FIG. 1. The memory may then be a volatile memory of a random access memory type.

Figure 3A:
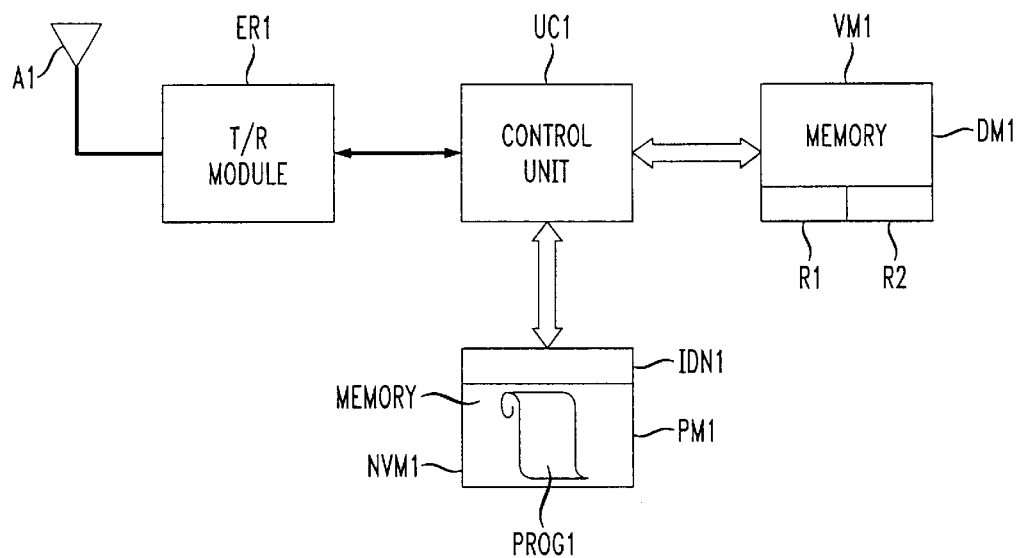
FIGS. 3a and FIG. 3b show a schematic embodiment of an electronic card and an interrogation unit, according to the present invention.

The information elements are transmitted with a digital bit rate equal to 106 kilobytes per second (kb/s). The messages are sent by amplitude modulation of a radio frequency carrier wave with a frequency equal to 13.56 Megahertz (MHz). The depth of the modulation is equal to 15%. FIG. 3 gives a schematic view of an embodiment of an electronic card 11 appropriate to the implementation of the method according to the invention.

An electronic card 11 of this kind has an antenna A1 for sending and receiving messages by electromagnetic radio frequency waves. This antenna A1 is connected to a sending/receiving module ER1 that combines a set of known circuits that need not be described in detail in the present description because they are readily known by those skilled in the art.

These circuits are designed to fulfill several functions. In the receiving mode, the circuits enable the following. Filtering of the radio frequency signal picked up by the antenna A1. Demodulation of the signal, and filtering of the demodulated signal to eliminate low frequency components due to electromagnetic noise introduced by the transmission channel. Retrieval of the transmission frequency and rate. Sampling of the demodulated signal in a synchronous manner, and finally, extracting the useful data elements from the received message.

In the sending mode, the circuits enable the following. Shaping of a message that is to be sent by the useful information word or words to be transmitted, generating the radio frequency carrier at 13.56 MHz. Its amplitude modulation is a function of the value of the bits of the message to be sent. Amplification of the modulated radio frequency signal, and applying this signal to the input of the antenna A1.

The electronic card 11 furthermore includes a control unit UC1 designed to control its operation. The control unit UC1 may be a microprocessor. The control unit UC1 is linked with a non-volatile memory NVM1. This memory includes a zone PM1 in which there is permanently recorded a program PROG1 for the operation of the electronic card 11. This program PROG1 directs the control unit UC1. It also includes a zone IDN1 in which the identification number of the electronic card 11 is recorded permanently.

The control unit UC1 is also linked with a volatile memory VM1. This memory includes a zone DM1 in which the data elements can be backed up during operation of the electronic card 11. It shall be seen here below that the variable number according to the invention is backed up in this zone DM1 during the implementation of the identification method according to the invention. This memory furthermore includes memory locations, such as registers R1 and R2, that are appropriate for the back-up of two digital information elements or flags whose logic value 1 or 0 determines the configurations of the electronic card 11.

To simplify the description, it will be said that, of these registers R1 and R2, R1 has the function of indicating that the electronic card has already been identified. In this case, the electronic card 11 is not authorized to respond to a general interrogation message sent by the interrogation unit 10. Furthermore, R2 has the function of indicating whether the electronic card 11 is authorized to respond to the particular interrogation messages sent by the interrogation unit 10. The general interrogation message and the particular interrogation messages referred to here above are messages that come into play in the implementation of the identification method according to the invention, whose role shall be explained further below.

The state register R1 is tested at the reception of any general interrogation message. If the state register R1 is in the logic state 0, no action occurs in the electronic card 11. In particular, the electronic card 11 sends no response messages. Similarly, the register R2 is tested at reception of any particular interrogation message. If this register is in the logic state 0, no action occurs in the electronic card 11. In particular, the electronic card 11 sends no response message.

The registers R1 and R2 are initially programmed at the logic value 1 in such a way that the electronic card 11 is authorized to respond respectively to a general interrogation message and to a particular interrogation message. It shall be seen hereinafter, during the identification of all the electronic cards 11–15 present in the investigation zone 20, that an electronic card that has just been identified is put to sleep through the transmitting by the interrogation unit 10 of a putting-to-sleep message S(X), where X is a parameter that designates the electronic card for which this message is intended. More specifically, this parameter takes the value of the identification number that has just been reconstructed. An identified electronic card 11 is one whose identification number has just been reconstructed.

Sending of the putting-to-sleep message for an electronic card 11 that has just been identified prompts the programming of a logic value 0 in the state registers R1 and R2 of the electronic card so that the electronic card is no longer authorized to respond to the general or particular interrogation messages subsequently sent by the interrogation unit 10. We shall also see how and when the logic value 0 is programmed in the state register R2 alone. This implies that the electronic card 11, even if it is as yet unidentified, i.e., R1 at the logic value 1, the electronic card is no longer authorized to respond to the particular interrogation messages sent by the interrogation unit 10.

Figure 3B:
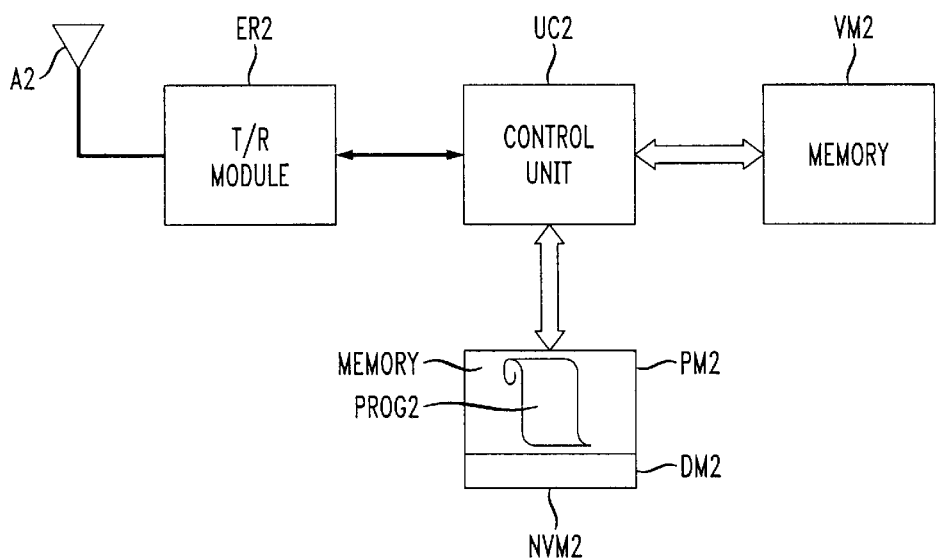

FIG. 3b shows a schematic embodiment of an interrogation unit 10 appropriate for the implementation of the method according to the invention. Just like the electronic cards 11–15, one of which is shown schematically in FIG. 3a, the interrogation unit 10 includes an antenna A2, a sending/receiving module ER2, a control unit UC2, and a non-volatile memory NVM2 including a program zone PM2 and a data zone DM2. These items are comparable and fulfil the same functions as the corresponding items A1, ER1, UC1, NVM1, PM1 and DM1 of the electronic card described above.

Thus, the program zone PM2 has the function of permanently saving a program PROG2 that directs the control unit UC2 for the implementation of the identification method according to the invention. However, it is clear that the data zone DM2 contains data elements having another nature different from that of the electronic card identification number. These data elements may include an identification number of the interrogation unit 10, a manufacturing number and/or references, etc.

The control unit UC2 of the interrogation unit is also linked with a volatile memory VM2 including a first zone in which there is stored a number in the process of being reconstructed, hereinafter called a number RN. The volatile memory VM2 includes a second zone in which there is stored a modulo eight counter whose value will be referenced k' hereinafter, and a third zone recording the identification numbers of the already identified electronic cards present.

The identification method according to the invention identifies the electronic cards 11–15 present in the investigation zone 20 by reconstructing their identification numbers according to a tree-like iterative algorithm. As previously stated, the invention enables a faster identification of the electronic cards 11–15 present in the investigation zone 20, inasmuch as an identification number may be restored by blocks of bits. The size of a block of bits identified with a given iteration of the algorithm depends, as shall be seen more clearly below, on the value of the identification number of the other electronic cards 11–15 that are as yet unidentified and authorized to respond, which are also in the investigation zone 20.

Preferably, the identification numbers are identified beginning with their most significant bits, and then the other bits in decreasing order of their significance. In the description that follows, the most significant bit will sometimes be designated by an identification number with reference to the first bit of the number. Similarly, terms such as "following", "preceding", "first" and "last" shall be used below with reference to this convention. However, through the necessary adaptations which will be clear to those skilled in the art, it would also be possible to proceed differently in identifying the bits according to another relationship. In particular, it is equally possible to proceed in the reverse order in beginning by identifying the least significant block and then the other bits in increasing order of significance without modifying the method of the invention.

Each iteration of the algorithm of the method according to the invention includes step A for transmission of an interrogation message by the interrogation unit as well as, and if necessary, a step B for sending a response message by at least one as yet unidentified electronic card 11 that is present, and a step C for the reception and analysis of the response messages received by the interrogation unit 10. These steps A, B and C shall now be described before explaining an exemplary implementation of the algorithm according to the invention.

As already stated, the interrogation message sent by the interrogation unit 10 (step A) may be of two different types. It may be a general interrogation message GC, but it may also be a particular interrogation message PC. A general interrogation message is a message having the format shown in FIG. 2, in which the useful information word sent is a control word whose value is, for example, 00100000.

A particular interrogation message is a message having the format shown in FIG. 2, in which the useful information word sent is a control word whose value is, for example, 00101xxx. The three least significant bits of this word determine the value of a parameter k of the message, which may take eight different values for identification numbers encoded on 8 bits. This is why, hereinafter, the reference PC(k) is used to designate a particular interrogation message whose parameter is equal to k. The role of this parameter shall appear hereinafter.

A general interrogation message is sent to the first iteration of the algorithm according to the invention. Here below, we shall describe an iteration that starts with the sending of a general interrogation message. A general interrogation message GC that is sent is intended for all the electronic cards 11–15 present in the investigation zone 20 that are as yet unidentified. The meaning of the expression "intended for" used here above must be specified: this expression introduces the group of electronic cards 11–15 on which the message in question produces an effect, namely the electronic cards that receive it and in which an action is performed as a consequence of this reception. For the other electronic cards 11–15 that may be present, the message has no effect and no action is taken.

At the reception of a general interrogation message, the following actions (step B) are performed in each electronic card 11–15 for which it is intended. An intended electronic card 11 is an electronic card present that is as yet unidentified, i.e., each electronic card 11 whose state register R1 contains the logic value 1. Programming of the logic value 1 is performed in the second state register R2 so that the electronic card 11, if this is not already the case, is authorized to respond to the particular interrogation messages that might subsequently be sent by the interrogation unit 10. The role of this step shall appear in the rest of the description of the present exemplary implementation of the invention.

Next, assigning as a current value of the variable number VNp the value of the identification number of the electronic card 11, where the index p distinguishes any one of the electronic cards from the others. The electronic card 11 sends a response message including the value number VNp. Thus, in response to a general interrogation message GC, all the electronic cards 11–15 present that are as yet unidentified are led to send a response message including a number whose value is that of their identification number.

The possible reception, and as the case may be, the analysis of these response messages by the interrogation unit 10 (step C) makes it possible to define whether an action has to be performed or not performed during another iteration, and what action must thus be performed. All three cases may recur. A first case is the one where at least two response messages are received. These messages are necessarily received simultaneously inasmuch as the electronic cards 11–15 respond in the same time interval after the reception of the interrogation message. It will be noted that, by assumption, the bits of the variable numbers sent in the response messages are transmitted starting with the most significant bits.

Since the identification numbers of the electronic cards 11–15 are unique, it is clear that two variable numbers received by the interrogation unit 10 cannot be identical bit by bit. It follows that there is necessarily a position, hereinafter referenced i, of the variable numbers received at which two bits of different values are received simultaneously by the interrogation unit 10. It will be recalled that a simultaneous reception of this kind of two bits of different values is called a collision. In other words, therefore, in this first case, there is necessarily a collision at a position i between the variable numbers received.

The following actions are then performed in the interrogation unit 10 (step C.1). The identification of the value of a group of i bits of the number RN being restored and stored in the volatile memory VM2 of the interrogation unit 10 (FIG. 3b). More specifically, the i–1 first bits of the i bits are assigned the value of the i–1 bits of the variable numbers received before the collision, and the ith of the i bits is assigned an arbitrary logic value 1 or 0, for example, the logic value 1. This block is assigned in the decreasing value of significance to the bits of the number RN starting with the position corresponding to the position k' of the counter stored in the volatile memory VM2 of the interrogation unit 10 (FIG. 3b). The number k' indicates the position of the first as yet unidentified bit of the number RN. This number is initialized at the value 1 when the interrogation unit 10 sends a general interrogation message at step A.

Further steps include incrementing of the counter k' by i units, and sending of a particular interrogation message with, as the parameter k, the value i of the position of the variable numbers received at which the collision has occurred. In other words, the value k of the parameter of the particular message sent is assigned the value of i.

A second case is one where a single response message is received. This means that there is a single as yet unidentified electronic card 11 in the investigation zone 20. There is then no collision in the bits of the variable number received. This therefore provides an unambiguous indication of the value of the as yet unidentified bits of the number RN.

The following actions are then performed in the interrogation unit 10 (step C.2). The identification of a group of bits corresponding to the j last as yet unidentified bits of an electronic card 11 that is present, namely, the j last as yet unidentified bits of the number RN. The numbers j and k' are related to each other by the relationship j=8–(k'1) for the identification numbers encoded on 8 bits. In other words, the j last as yet unidentified bits of the number RN are complemented, with, in the order of their position, the value of the j first bits of the variable number received. As a result, all the bits of the identification number of an electronic card 11 present have been identified.

The actions further include incrementing the counter k' by j units. In other words, it is brought to the value eight, namely, to the value one since this is a modulo eight counter. The sending, by the interrogation unit 10, of the putting-to-sleep message S intended for the electronic card 11 thus identified so that the electronic card is no longer authorized to respond to general or particular interrogation messages subsequently sent by the interrogation unit 10.

The actions yet further include sending of a general interrogation message to determine that, in fact, no other as yet unidentified electronic card 11 is present in the investigation zone 20, and especially that no new electronic card has entered in the time interval that has elapsed since the last sending of a general interrogation message. As will have been understood, the step B for the sending of a response message by one or more of the electronic cards 11–15 present in the step C for reception and analysis of these response messages by the interrogation unit 10 are then those already described here above. In other words, the algorithm then loops back to step A.

A third case finally is the one where no response message is received by the interrogation unit 10. This means that there are no as yet unidentified electronic cards 11–15 in the investigation zone 20. The algorithm stops. This is the case when there is no electronic card 11 in the zone 20 or else when all the electronic cards present have already been identified. What remains to be done now is to describe the running of an iteration of the algorithm which starts, at step A, by sending a particular interrogation message PC(k).

It will be recalled that a particular interrogation message sent is intended for only certain of the electronic cards 11–15 present which are as yet unidentified. These as yet unidentified electronic cards 11 are the cards whose first state register R1 is at the logic value 1 while the certain electronic cards which are the only cards for which the particular interrogation message is intended are those whose second state register R2 is at the logic value 1. In other words, these electronic cards are the only ones authorized to respond to such a message.

This is why the state register R2, as well as the state register R1, are tested at the reception of a particular interrogation message by the electronic card 11. Indeed, it is necessary that the register R1 and also the register R2 should contain the logic value 1 so that the particular interrogation message will produce an effect on the electronic card 11. It will be seen that while all the electronic cards 11–15 fulfilling this twofold condition are theoretically authorized to respond to a particular interrogation message, only one part of these electronic cards effectively sends a response message.

Upon reception of a particular interrogation message, the actions performed (step B) in each electronic card 11 for which the message was intended are different depending on the current value of the variable number stored in the volatile memory VM1 of the electronic card. For the electronic cards 11–15 having a variable number VN1 whose kth bit has the arbitrary logic value is understood above with respect to the step C.1, namely, the logic value 1 in the example.

The modification of the current value of the variable number VNp is performed by shifting its bits by a number of positions equal to k, where k is the value of the above-mentioned parameter of the particular interrogation message. More specifically, since the bits of the variable numbers are received by the interrogation unit 10 beginning with the most significant bits, this shifting of the bits of the variable number by i positions is a leftward shift. Preferably, as the bits of the variable number are shifted leftwards, the least significant i bits of the number are assigned the same specified logic value 1 or 0, for example, the logic value 1.

Then, the sending by the electronic card 11 a response message including the variable number VNp, with its new current value resulting from the shift of its bits as described above. For the other electronic cards 11–15, namely, those that have a variable number VNp whose kth bit has the complementary logic value of the arbitrary logic value envisioned above, namely, the logic value 0 in the example, no response message is sent. Furthermore, the logic value 0 is programmed in the second state register R2 so that the electronic card 11 is no longer authorized to respond to the particular response messages subsequently sent by the interrogation unit 10.

The response messages sent by the electronic card or cards concerned are received and analyzed by the interrogation unit 10 in step C that runs identically to what was described above with reference to the processing of an iteration that begins with the sending of a general interrogation message. There is no reason to return to this description.

It will simply be noted, as those skilled in the art will have understood, that if at least one as yet unidentified electronic card 11 sends a message in response to a general interrogation message sent by the interrogation unit 10, then this interrogation unit will send as many interrogation messages as are needed to arrive at the complete identification of the identification number of one of these electronic cards. That is, by also carrying out a complete journey in the tree of the identification numbers.

At each iteration, beginning with the sending of a particular interrogation message, a portion of the as yet unidentified electronic cards 11–15 may be placed in a state in which they are no longer authorized to respond to the particular interrogation messages because of the programming of a logic value 0 in their second state register R2. At each of these iterations, progress is made in the tree of the identification numbers, since one or more bits are identified. That is, there is a descent along one or more generations of the tree.

However, since they are as yet unidentified, the electronic cards 11–15 thus left aside must be concerned by the subsequent explorations of the tree of identification numbers. This is why, as stated further above, a subsequent general interrogation message has the effect of programming the logic value 1 in the second state register R2 of the as yet unidentified cards whose first state register R2 still contains the logic value 1.

It will furthermore be noted that the function of the state registers R1 and R2 is to indicate, for each electronic card 11 respectively, whether it has already been identified and whether it is authorized to respond to the particular interrogation messages. However, those skilled in the art may envision other ways of carrying out the function of these two registers. The same observation can be made with respect to the modulo eight counter giving the value of k'. This is why, the registers R1 and R2 and the number k', as well as the operations that relate to them, have been presented here above only to illustrate a possible example for the implementation of the algorithm of the method according to the invention.

An actual exemplary implementation of the identification method according to the invention shall now be described with reference to FIG. 4. This explanation shall place five electronic cards 11, 12, 13, 14 and 15 within the investigation zone 20, as shown in FIG. 1. These electronic cards have an identification number whose value in binary notation is respectively 01100001, 01110010, 00100110, 00100111 and 01110000.

FIG. 4 is a table in which the first column (to the left) indicates the number of an iteration of the algorithm. The second column indicates, for each iteration, the nature of the interrogation message sent by the interrogation unit 10. For the particular interrogation messages, this second column specifies the value of the parameter k between brackets.

The next five columns record the value of the variable numbers VN11 to VN15 stored in each of the cards 11–15 respectively, as can be seen at the end of the iteration step B. For clarification, these columns indicate only the current values of the variable numbers of the electronic cards 11–15 that are then authorized to respond to the particular interrogation message.

The eighth column indicates the value of the number RN under reconstruction. This is stored in the volatile memory VM2 of the interrogation unit 10, such as it appears at the end of the iteration step C. The values of the as yet unidentified bits, which are therefore unknown, are replaced by the sign x. This notation in no way prejudices the real state of programming of the corresponding bits of the number in the memory VM2.

The ninth column indicates the value of the position i at which there may possibly occur a collision between the bits of the variable numbers sent in response to the interrogation messages. When no collision occurs, namely when only one response message is sent by the electronic cards 11–15, the value of i is zero. Finally, the tenth column indicates the value, for each iteration, of the number k' designating the position of the first as yet unidentified bit of the number RN under reconstruction as it appears at the end of the step C of the iteration.

The contents of the table speak for themselves and can be understood very easily in light of the details given here above on the running of each iteration in general cases. It therefore does not appear to be necessary to comment on the contents of each line of the table. It will simply be noted that, in the step 12, no electronic card 11 sends any response message. There is no variable number in any of the columns VN11 to VN15. This indicates that there is no longer any unidentified electronic card 11 in the investigation zone 20. Thus, no more than 12 iterations of the algorithm were needed to fully identify five electronic cards present.

This result is made possible by the advantageous effect of the method of the invention according to which a block of several bits may be identified at each iteration. For example, it can be seen that, at the ninth iteration, it has been possible to identify six bits of the identification number of an electronic card 11 present. An example should also be given on the way in which the collisions may be detected.

In an advantageous exemplary embodiment, the bits are encoded according to a return-to-zero encoding of the signal in the length of the bit, i.e., so-called RZ encoding, such as the Manchester type encoding. According to this encoding, sending of a bit with a logic value 1 corresponds to an electrical signal on the transmission channel that is at a high level, for example, 5 volts, during the first half to the duration To. Transmission of the bit corresponds to an elementary temporal unit, and is at a low level, for example, 0 volts, during the second half of this duration To.

Figure 5A:
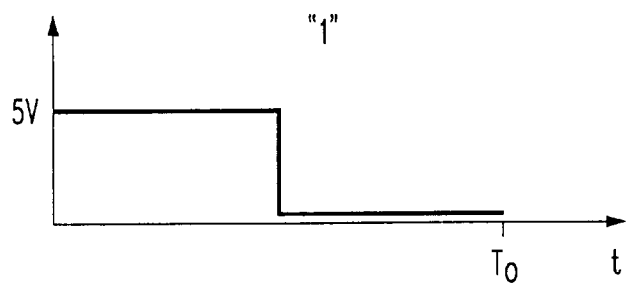
FIGS. 5a to 5d shows the shape of the electrical signal present in the transmission channel for the duration of the transmission of a bit as a function of the value of the bit or bits transmitted, according to the present invention.

FIGS. 5a to 5d show the level of the electrical signal present on the transmission channel in different cases. FIG. 5a pertains both to the case where a bit with a logic value 1 is sent alone and to the case where several bits with a logic value 1 are sent simultaneously. It may be observed that it is impossible to distinguish between these two cases inasmuch as, when such a case arises, the electrical signals corresponding to the simultaneous sending of several bits of the same value are superimposed precisely. There is no collision.

Figure 5B:
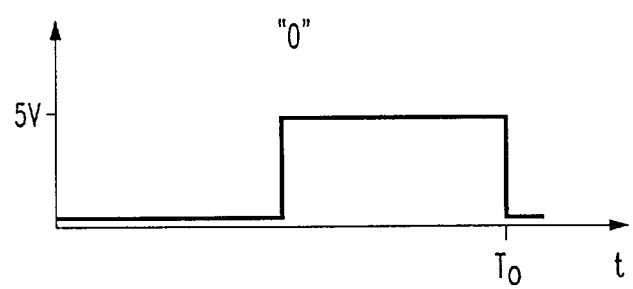
Figure 5C:
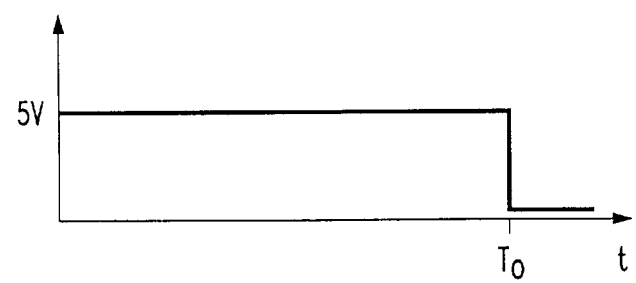

Symmetrically, FIG. 5b corresponds both to the case where a bit with a logic value 0 is sent alone and to the case where several bits with a logic value 0 are sent simultaneously. These two cases call for the same observation as in the previous paragraph. FIG. 5c corresponds to the case where at least one bit with a logic value 1 and at least one bit with a logic value 0 are sent simultaneously. It will be observed that, since the electrical signals are complementary to one another, the resultant of their superposition is an electrical signal at the high level (5 volts) throughout the duration To. This is the case with a collision between bits transmitted on the channel has occurred.

Figure 5D:
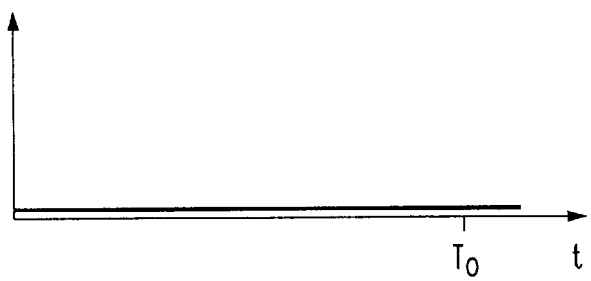

Conversely, FIG. 5d corresponds to the case where no bit is sent on the transmission channel. It is clear that no electrical signal is then present on the channel. For a message received by an electronic card, no collision may occur inasmuch as the interrogation unit is unique and inasmuch as, consequently, only one interrogation message at a time is sent on the transmission channel.

Thus, it is sufficient to sample the electrical signal present in the channel only once in the first half of the duration To. Depending on the level of this sample (0 to 5 volts), the control unit UC1 knows the logic value of the bit (0 or 1 respectively). However, it is also possible to take a second sample in the second half of the duration To in order to determine that this sample truly has a level that is complementary to the level of the preceding sample, namely 5 or 0 volts respectively.

For a message received by the interrogation unit 10, however, the situation is different. A collision may occur between the bits of the variable numbers contained in at least two response messages transmitted simultaneously by a plurality of electronic cards 11–15. This is why the sampling of the interrogation unit 10 must imperatively take a sample in the first half of the duration To and a second sample in the second half of this duration. These two samples may present either a high level and a low level, or a low level and a high level, or again two high levels, or finally two low levels. These cases correspond respectively to those shown in FIGS. 5a, 5b, 5c and 5d. This is to say that they correspond, respectively, to a bit with a logic value 1, a bit with a logic value 0, a collision or an absence of a bit. Thus, it will be understood that the use of a manchester type encoding enables implementation of a method for detection of a possible collision during the reception of a message by the interrogation unit.

What is claimed is:

1. A method for identifying one or more electronic cards by an interrogation unit, each electronic card assigned a unique identification number, the method comprising:
   (a) transmitting a general interrogation message within an investigation zone;
   (b) receiving one or more response messages from the one or more electronic cards present within the investigation zone responsive to the general interrogation message, each response message comprising a variable number; and
   (c) reconstructing according to a tree-like iterative algorithm each response message for the identification number corresponding to an electronic card, the reconstructing comprising
      (c.1) if at least two response messages are received simultaneously, then identifying a value of a group of i bits of an identification number of an as yet unidentified electronic card present and, in looping to (a), transmitting a particular interrogation message having a parameter k assigned a value of i, and
      (c.2) if a single response message is received, then identifying a group of j as yet unidentified last bits of the identification number of an electronic card present so that the electronic card is identified and, in looping to (a), transmitting a general interrogation message.

2. A method according to claim 1, further comprising transmitting a response message by the one or more electronic units authorized to respond to the particular interrogation message transmitted by the interrogation unit in (c.1), the response message comprising a variable number whose kth bit has a predetermined logic value, the current value of the variable number is modified after receiving the particular interrogation message and before being transmitted by shifting its bits by a number of positions equal to k, where k is an integer parameter of the particular interrogation message.

3. A method according to claim 2, further comprising placing the one or more electronic cards that received the particular interrogation message in a state where they are no longer authorized to respond to the particular interrogation message and they transmit only at reception of a new general interrogation message.

4. A method according to claim 1, further comprising between (a) and (c.2) transmitting by the interrogation unit a putting-to-sleep message intended for an identified electronic card so that the identified electronic card is no longer authorized to respond to the general or particular interrogation messages sent by the interrogation unit.

5. A method according to claim 1, wherein the group of i bits in (c.1) comprises i–1 first bits assigned a value of i–1 bits of the variable numbers received before collision and an ith of the i bits is assigned a predetermined logic value.

6. A method according to claim 1, wherein the j identified bits in (c.2) are assigned a value of the j first bits of the variable number received in the response message so that the identification number of an electronic card present is completely reconstructed.

7. A method according to claim 1, further comprising shifting bits by i positions starting with the most significant bits of the variable numbers being received by the interrogation unit.

8. A method according to claim 7, wherein i least significant bits of the variable number are assigned a same specified logic value as the bits of the variable number are shifted.

9. A method for identifying a plurality of electronic cards, each electronic card assigned a unique identification number encoded on M bits, the method comprising:
   reconstructing the identification number of each electronic card present in an investigation zone according to a tree-like iterative algorithm, and at each iteration the method comprises
   (a) transmitting by an interrogation unit an interrogation message comprising a general interrogation message intended for unidentified electronic cards present within an investigation zone, the general interrogation message being sent at a first iteration, and if only selected electronic cards are authorized to respond, then transmitting by the interrogation unit an interrogation message comprising a particular interrogation message;
   (b) transmitting a response message comprising a variable number if the interrogation message is a general interrogation message, simultaneously by each of the as yet unidentified electronic cards present, in which case a value of the identification number of the electronic card is assigned before transmitting the response message as a current value of the variable number, and
   if the interrogation message is a particular interrogation message, the transmitting of a response message comprising a variable number simultaneously by only those of the electronic cards present authorized to respond to such a message that have a variable number whose kth bit has a predetermined logic value, in which case the current value of the variable number is modified after receiving the particular interrogation message and before being transmitted by shifting its bits k positions, where k is an integer parameter of the particular interrogation message, other cards of this kind being placed in a state where they are no longer authorized to respond to the particular interrogation message and from which they transmit only at the reception of a new general interrogation message; and
   (c) simultaneously receiving response messages by the interrogation unit and analyzing identification numbers received, the method further comprising
      (c.1) in event of receiving at least two response messages, then identifying a value of a group of i bits of an identification number of an as yet unidentified electronic card present and, in looping to (a), transmitting a particular interrogation message having a parameter k assigned a value of i, and
      (c.2) in event of receiving a single response message, identifying a group of j as yet unidentified last bits of the identification number of an electronic card present so that the electronic card is identified and, in looping to (a), transmitting a general interrogation message.

10. A method according to claim 9, further comprising between (a) and (c.2) transmitting by the interrogation unit a putting-to-sleep message intended for an identified electronic card so that the electronic card is no longer authorized to respond to the general or particular interrogation messages sent by the interrogation unit.

11. A method according to claim 9, wherein the group of i bits in (c.1) comprises i–1 first bits assigned a value of i–1 bits of the variable numbers received before collision and an ith of the i bits is assigned a predetermined logic value.

12. A method according to claim 9, wherein the j identified bits in (c.2) are assigned a value of the j first bits of the variable number received in the response message so that the identification number of an electronic card present is completely reconstructed.

13. A method according to claim 9, further comprising shifting bits by i positions starting with most significant bits of the variable numbers being received by the interrogation unit.

14. A method according to claim 13, wherein i least significant bits of the variable number are assigned a same specified logic value as the bits of the variable number are shifted.

15. An identification system comprising:
   an interrogation unit transmitting a general interrogation message within an investigation zone; and
   at least one electronic card within the investigation zone receiving the general interrogation message and transmitting a response message comprising a variable number in response thereto, each of said at least one electronic card being assigned a unique identification number;
   said interrogation unit reconstructing each response message for the identification number corresponding to one of said at least one electronic card, the reconstructing according to a tree-like iterative algorithm such that
      (c.2) if at least two response messages are received simultaneously, then identifying a value of a group of i bits of an identification number of an as yet unidentified electronic card present and transmitting a particular interrogation message having a parameter k assigned a value of i, and
      (c.2) if a single response message is received, then identifying a group of j as yet unidentified last bits of the identification number of an electronic card present so that the electronic card is identified and transmitting a general interrogation message.

16. An identification system according to claim 15, wherein said at least one electronic unit authorized to respond transmits a response message to respond to the particular interrogation message transmitted by the interrogation unit in (c.1), the response message comprising a variable number whose kth bit has a predetermined logic value, the current value of the variable number is modified after receiving the particular interrogation message and before being transmitted by shifting its bits by a number of positions equal to k, where k is an integer parameter of the particular interrogation message.

17. An identification system according to claim 16, wherein said at least one electronic card receiving the particular interrogation message is placed in a state where they are no longer authorized to respond to the particular interrogation message and they transmit only at reception of a new general interrogation message.

18. An identification system according to claim 15, wherein said interrogation unit transmits a putting-to-sleep message intended for an identified electronic card so that said identified electronic card is no longer authorized to respond to the general or particular interrogation messages sent by said interrogation unit.

19. An identification system according to claim 15, wherein the group of i bits in (c.1) comprises i−1 first bits assigned a value of i−1 bits of the variable numbers received before collision and an ith of the i bits is assigned a predetermined logic value.

20. An identification system according to claim 15, wherein the j identified bits in (c.2) are assigned a value of the j first bits of the variable number received in the response message so that the identification number of an electronic card present is completely reconstructed.

21. An identification system according to claim 15, wherein bits of the variable number are shifted by i positions starting with the most significant bits being received by said interrogation unit.

22. An identification system according to claim 21, wherein i least significant bits of the variable number are assigned a same specified logic value as the bits of the variable number are shifted.

23. An identification system comprising:
 an interrogation unit; and
 at least one electronic card comprising
  a control unit controlled by a program,
  a first non-volatile memory to back up the program,
  a second non-volatile memory to store a unique identification number encoded on M bits corresponding to said at least one electronic card,
  a first state register having a predetermined logic value when said at least one electronic card has already been identified, and is at a complementary logic value when said at least one electronic card has not been identified,
  a second state register set at a specified logic value when said at least one electronic card is authorized to respond to a particular interrogation message sent by said interrogation unit,
  a third volatile memory to store a variable number, and
  a transceiver circuit for transmitting and receiving messages with said interrogation unit,
  said control unit cooperating with said interrogation unit for reconstructing the identification number of said at least one electronic card present in an investigation zone according to the program, the program comprising a tree-like iterative algorithm causing at each iteration
   (a) transmitting by said interrogation unit an interrogation message comprising a general interrogation message intended for unidentified electronic cards present within an investigation zone, the general interrogation message being sent at a first iteration, and if only selected electronic cards are authorized to respond, then transmitting by said interrogation unit an interrogation message comprising a particular interrogation message;
   (b) transmitting a response message comprising a variable number if the interrogation message is a general interrogation message, simultaneously by each of the as yet unidentified electronic cards present, in which case a value of the identification number of the electronic card is assigned before transmitting the response message as a current value of the variable number, and
   if the interrogation message is a particular interrogation message, the transmitting of a response message comprising a variable number simultaneously by only those of the electronic cards present authorized to respond to such a message that have a variable number whose kth bit has a predetermined logic value, in which case the current value of the variable number is modified after receiving the particular interrogation message and before being sent by shifting its bits k positions, where k is an integer parameter of the particular interrogation message, other electronic cards of this kind being placed in a state where they are no longer authorized to respond to the particular interrogation message and from which they transmit only at the reception of a new general interrogation message; and
   (c) simultaneously receiving response messages by said interrogation unit and analyzing identification numbers received, the method further comprising
    (c.1) in event of receiving at least two response messages, then identifying a value of a group of i bits of an identification number of an as yet unidentified electronic card present and, in looping to (a), transmitting a particular interrogation message having a parameter k assigned a value of i, and
    (c.2) in event of receiving a single response message, identifying a group of j as yet unidentified last bits of the identification number of an electronic card present so that the electronic card is identified and, in looping to (a), transmitting a general interrogation message.

24. An identification system according to claim 23, wherein said interrogation unit transmits a putting-to-sleep message intended for an identified electronic card so that said identified electronic card is no longer authorized to respond to the general or particular interrogation messages sent by said interrogation unit.

25. An identification system according to claim 23, wherein the group of i bits in (c.1) comprises i−1 first bits assigned a value of i−1 bits of the variable numbers received before collision and an ith of the i bits is assigned a predetermined logic value.

26. An identification system according to claim 23, wherein the j identified bits in (c.2) are assigned a value of the j first bits of the variable number received in the response message so that the identification number of an electronic card present is completely reconstructed.

27. An identification system according to claim 23, wherein bits of the variable number are shifted by i positions starting with the most significant bits being received by said interrogation unit.

28. A method according to claim 27, wherein i least significant bits of the variable number are assigned a same specified logic value as the bits of the variable number are shifted.

* * * * *

UNITED STATES PATENT AND TRADEMARK OFFICE
CERTIFICATE OF CORRECTION

PATENT NO.   : 6,321,982 B1
DATED        : November 27, 2001
INVENTOR(S)  : Jean-Marie Gaultier It is certified that error appears in the above-identified patent and that said Letters Patent is hereby corrected as shown below:

Column 1,
Line 5, delete "dentification" insert -- identification --.
Line 6, delete "dentification" insert -- identification --.

Column 16,
Line 34, delete "(c.2)" insert -- (c.1) --.

Signed and Sealed this

Seventh Day of May 2002

Attest:

JAMES E. ROGAN
Attesting Officer       Director of the United States Patent and Trademark Office